United States Patent [19]

Savin

[11] Patent Number: 5,338,348

[45] Date of Patent: Aug. 16, 1994

[54] ZINC POWDER-RICH COATING COMPOSITION

[76] Inventor: Ronald R. Savin, 11001 Muirfield Dr., Rancho Mirage, Calif. 92270

[21] Appl. No.: 125,430

[22] Filed: Sep. 22, 1993

[51] Int. Cl.$^5$ .................. C09D 5/10; C08K 3/08
[52] U.S. Cl. .................. 106/14.44; 106/14.05; 106/14.41; 106/14.43; 523/220; 523/442; 523/443; 523/459; 524/379; 524/391; 524/439; 524/492; 524/493
[58] Field of Search .................. 106/1.29, 14.05, 14.41, 106/14.43, 14.44; 523/220, 442, 443, 459; 524/492, 493, 379, 391, 439

[56] References Cited

U.S. PATENT DOCUMENTS

| | | | |
|---|---|---|---|
| 4,417,007 | 11/1983 | Salensky et al. | 523/422 |
| 4,891,394 | 1/1990 | Savin | 523/422 |
| 5,098,938 | 3/1992 | Savin | 523/220 |
| 5,167,701 | 12/1992 | Savin | 106/14.41 |
| 5,200,057 | 4/1993 | Canaris | 106/1.29 |
| 5,248,406 | 9/1993 | Kamitani | 106/1.29 |

FOREIGN PATENT DOCUMENTS

| | | | |
|---|---|---|---|
| 2065828 | 10/1992 | Canada . | |
| 2074329 | 1/1993 | Canada . | |
| 2602239 | 7/1986 | France . | |
| 57-192471 | 11/1982 | Japan | 106/14.05 |
| 2155047 | 9/1985 | United Kingdom | 106/1.29 |

*Primary Examiner*—Anthony Green
*Attorney, Agent, or Firm*—Frost & Jacobs

[57] ABSTRACT

A coating composition for use in protecting metallic substrates from corrosion, comprising in weight percent, based on the total weight of the composition: from about 7% to 35% of film-forming substance; from about 35% to 55% of zinc powder; from about 5% to 25% of zinc flakes; from about 1% to 5% at least one kind of amorphous silica; and up to about 30% particulate ferrophosphate.

6 Claims, No Drawings

ZINC POWDER-RICH COATING COMPOSITION

FIELD OF THE INVENTION

This invention relates generally to organic solvent-based, water-borne and powder, coating compositions. Particularly, this invention relates to an improvement coating composition which provides enhanced resistance to environmental attack of metallic substrates and which can be applied by any conventional coating technique. More particularly, this invention relates to a zinc-powder (as defined herein)rich coating composition which satisfies the objects set forth herein. The coatings deposited by the composition of the invention are highly electrically conductive and highly cathodic when applied over a ferrous metal substrate, and can be recoated with any topcoat at any time.

BACKGROUND OF THE INVENTION

The outstanding corrosion resistance afforded by galvanizing has made it the most effective means for the long term protection of steel from oxidation (rusting) and subsequent corrosion. It is the conventional method of providing protection for guardrails, transmission towers, light poles, electrical equipment and dozens of other specific applications. Five mils or 125 microns of a galvanizing composition (applied to light poles and transmission towers) will protect exposed equipment for a period in excess of 20 years. Guardrails may be coated with an average deposition of 75 microns and provide approximately 10 years of corrosion protection in an average rainfall environment. Galvanizing compositions are applied both by hot dipping and electroplating, in applications where surface coatings do not provide adequate corrosion resistance.

Galvanizing compositions are made from zinc "ingots" and become oxidized only when exposed to the elements. The high conductivity of galvanizing compositions provides excellent cathodic protection to steel (which acts as the cathode, zinc being the anode), when exposed to a saline environment or other forms of oxidation caused primarily by water in its various forms, moisture, vapor and ice.

Zinc dust rich primers having an inorganic binder or vehicle have been in use for about 40 years. Typically such compositions contain about 80% to about 95% by weight zinc dust, and alkyl silicate has been the inorganic binder of choice. Single-package primer compositions containing about 80% to about 90% by weight zinc dust and ethyl silicate binder have been in use for about the last 20 years.

A brochure published by AKZO N.V. (publication date unknown) discusses the development of zinc-rich primers, the preparation of ethyl silicate and its use and mechanism as a binder. This publication explains that ethyl silicate is derived from tetraethyl orthosilicate which is reacted with water in the presence of an organic solvent to produce liquid polysiloxane resins. When used in a zinc-rich primer, evaporation of the solvent after application of the coating results in transformation of the polysiloxane resin to amorphous silica, which becomes the bonding film in the cured coating. The amorphous silica reacts chemically with some of the zinc powder in the coating to form zinc silicate compounds. The silica will also react with the ferrous metal substrate, particularly if it is previously abraded or sandblasted, to form iron-(zinc)-silicate bonds. Silicate mineral extenders frequently used in zinc-rich primers also are believed to react chemically in such inorganic systems. The resulting bonding matrix allows a controlled galvanic current flow between the ferrous substrate and the zinc pigment (cathodic and anodic to one another, respectively), thus providing long term galvanic protection, including scratched or abraded bare areas of substrate due to adjacent zinc metal.

U.S. Pat. No. 4,417,007, issued Nov. 22, 1983, to Salensky et al., discloses a zinc-rich paint formulation containing manganomanganic oxide as a color pigment, in which the binder may be any one of (1) epoxy resins, (2) that derived by reaction from diglycidyl ether of bisphenol A and vegetable oil fatty acids, (3) that derived from bisphenol A and epichlorohydrin, or (4) alkyl silicate. From about 43% to 90% by weight zinc dust, and from about 3% to 38% manganomanganic oxide are present, along with from about 4% to 25% by weight epoxy resin binder, 0 to about 35 % by weight pigment extenders and binders, 0 to about 5% by weight of a pigment suspension agent and balance solvent, in a claimed embodiment.

U.S. Pat. No. 4,891,394, issued Jan. 1990 to R. R. Savin, discloses a coating composition comprising about 10% to about 25% by weight of a film-forming polymer which may be an epoxy resin, a vinyl chloride resin copolymerized with polyisocyanates, or a vinyl chloride resin copolymerized with melamines; about 30% to about 60% by weight particulate metallic zinc (zinc dust as explained more fully below); a crystalline silica having an oil absorption value of less than 20 measured by ASTM Test D281-84, the volumetric ratio of such silica to zinc ranging from about 0.7:1 to about 1.25:1; about 2% to about 3% by weight of a pyrogenic amorphous silica having an average particle size less than about 0.012 micron (for control of rheological characteristics); and at least one solvent for the film-forming polymer.

French Patent 8611238 (Publication No. 2,602,239), published February, 1988, in the name of R. R. Savin, discloses a two part coating composition containing up to 70% by weight of a powdered metal (based on the total weight after admixture) (metal dust as explained more fully below); about 2% to 30% by weight of a film-forming polymer (as an organic binder); about 2% to about 30% of a hardener for the polymer; at least 1.8% and up to 30% of an agent for control of rheological characteristics; and up to 30% organic solvents. A preferred polymer is an epoxy resin having an average molecular weight of 350 to 3800. The agent for control of rheological characteristics includes at least one pyrogenic silica and optionally at least one natural or transformation silica having an oil absorption value preferably not greater than 90 and more preferably not greater than 40.

U.S. Pat. 5,098,938, issued March 1992 to R. R. Savin, discloses a coating composition similar to that of the above-mentioned U.S. No. Pat. 4,891,394, wherein an epoxy resin film-forming binder is used, and wherein at least four different size grades of pyrogenic amorphous silicas are present within specified proportions and average particle sizes, together with a crystalline silica having an oil absorption value of less than 20 measured by ASTM Test D281-84.

Canadian Patent 2,065,828 provides a waterborne zinc-rich anticorrosion primer which is based upon the combination of metallic zinc dust with a stable aqueous dispersion of a particular chlorinated addition copolymer. Such primer can be formulated without the need for significant amounts of organic co-solvents. There primers readily cure at ambient temperatures, allow overcoating shortly after drying, and result in films of desirable hardness, resiliency and adhesion both to the substrate and topcoat.

Canadian Patent 2,074,329 relates to an improved powder coating composition comprising (a) a resin, (b) a curing agent and (c) zinc, wherein the zinc is a mixture of (c1) lamellar zinc (zinc flakes) and (c2) zinc dust.

U.S. Pat. 5,167,701 issued December 1992 to R. R. Savin discloses a one-package zinc-rich coating composition having an inorganic binder which provides protection of metallic substrates against environmental attack comprises, in volume percent: from about 55% to about 60% of an alkyl silicate solution having a solids content of about 35% to about 45% by weight; about 10% to about 14% zinc dust of at least one different particle size grade; about 0.5% to about 2.5% zinc flakes; about 3% to about 6% particulate ferrophosphate; about 10% to about 17% of a particulate crystalline silica having an oil absorption value of less than 20 measured by ASTM Test D 281-84; about 1% to about 2.5% of at least two different size grades of pyrogenic amorphous silicas having average particle sizes ranging from about 0.007 to about 0.04 micron; about 0.3% to about 0.5% of a wetting agent; and about 7% to about 8% of an anhydrous alcohol solvent.

Coatings made from zinc dust provide only limited protection to bare metal due to its much lower conductivity than zinc metal caused by oxidizing during its manufacturing process. In conventional zinc rich paints the greater the conductivity the greater the area of adjacent bare steel will be protected by the zinc metal. The level of adjacent bare metal protection is largely proportional to its conductivity measured in ohms/cm$^2$. All galvanizing compositions, prior to exposure, will measure total conductivity of 0.00 ohm/cm$^2$ at 75 micron deposition, whereas organic zinc rich industrial and maintenance coatings will measure from 1 to several dozen ohms/cm$^2$ at 75 microns based on the percentage of zinc dust and the particle size of the zinc dust utilized. In order to provide adequate continuity, zinc incorporated in organic primers customarily contains between 80-95 wt % of zinc dust to the binder including additives. The high percentage of zinc dust provides improved conductivity contributing improved cathodic protection, however, the high density and low binder content causes serious problems in handling and poor substrate adhesion requiring sand blasted metal to secure adequate adhesion.

Zinc powder has not been used in zinc rich coating systems due to its large particle size, heavy sedimentation problems and has been ignored as an acceptable pigment. This application involves the use of zinc powder as a low cost galvanized metal replacement. Its relatively larger particle size permits excellent topcoat adhesion while galvanizing generally requires pre treatment such as acid etching or special wash primers to provide adequate adhesion. Most galvanized metal is normally not coated due to the cost involved in the pre-treatment and the application of a topcoat in field conditions. While the term "zinc powder" has been and continues to be used interchangeably with "zinc dust", as used herein "zinc powder" only means pulverized metallic zinc in granular form, which is different from "zinc dust", from "zinc powder" and from "particulate zinc", as these terms are generally understood. As used herein "zinc powder" also is different from "lamellar zinc" or "zinc flakes", as used in the Canadian Patent 2,074,329.

Thus, there is clearly a genuine need for a cost effective zinc-powder based coating composition for replacing traditional galvanizing compositions, which affords all the advantages of the galvanizing compositions.

SUMMARY OF THE INVENTION

It is an object of the present invention to provide a zinc-powder based coating composition which meets the above needs by overcoming the combined disadvantages of both inorganic and organic binder compositions in a cost effective manner.

In accordance with the present invention there is provided a coating composition for use in protecting metallic substrates from corrosion, comprising in weight percent, based on the total weight of the composition: from about 7% to 35% of film-forming substance; from about 35% to 55% of zinc powder; from about 5% to 25% of zinc flakes; from about 1% to 5% of at least one kind of amorphous silica; and up to about 30% particulate ferrophosphate.

While not so limited, the coating composition of this invention has particular utility generally as a replacement for galvanizing and more particularly in the protection of large steel structures such as bridges, ships, storage tanks, highway guardrails, reinforcing bars for concrete, and the like. In addition, the composition of the invention may be used in moving line applications such as undercoating for automotive body parts and interior areas of doors to replace current galvanizing applications.

DETAILED DESCRIPTION OF THE INVENTION

The film forming substances of the preferred embodiments of the present invention are selected from the group consisting of alkyl silicate in substantially anhydrous alkyl alcohol as a solvent, epoxy resins (powder and non-powder) and other well known equivalents thereof including vinyl chloride resins copolymerized with isocyanates, polyurethane resins, polyester resins, oil-modified polyester resins, polymers of acrylic, methacrylic esters and waterborne urethane or an emulsion polymer prepared by the polymerization of monomers selected from the group consisting of acrylic, methacrylic, vinyl or styrenic monomers, and mixtures thereof. Preferably the alkyl silicate solution is ethyl silicate in ethanol as a solvent. Other anhydrous alcohols may also be used as a solvent. Since storage stability or shelf life is dependent upon a substantially anhydrous composition, the ethanol solvent should be so-called absolute alcohol, which contains less than 0.1% water.

The presence of amorphous silica is necessary for soft settling or sedimentation in the one-package composition of the invention.

Moving line applications are readily accomplished with the composition of the invention, and setting of deposited coatings can be accelerated if desired by subjecting the deposited coating to steam. Drying can be effected in about 5 minutes by this technique. Application of coatings can be carried out by brushing, spraying or flowcoating. Coating thicknesses can range from about 1.5 to about 5 mils.

This application involves the use of zinc powder as a low cost galvanized metal replacement. Its relatively larger particle size permits excellent topcoat adhesion while galvanizing generally requires pre treatment such as acid etching or special wash primers to provide adequate adhesion. Most galvanized metal is normally not coated due to the cost involved in the pre-treatment and the application of a topcoat in field conditions.

As indicated in the above-mentioned AKZO publication, conventional zinc-rich coating compositions contained from about 80% to about 90% by weight zinc dust. In contrast to this, by substitution of the silica and ferrophosphate in place of part of the zinc dust in conventional inorganic binder compositions, the composition of the present invention contains about 35% to about 55% by weight zinc powder and 5% to 25% zinc flakes, thus substantially reducing the density and cost of the product while at the same time achieving excellent protection of metallic substrates against environmental attack and throw.

Ferrophosphate provides electrical conductivity when present within the broad range of up to about 30% by weight. Ferrophosphate is a relatively low cost material.

Zinc flakes, which are somewhat fibrous in shape (an aspect ratio of about 11:1), have high electrical conductivity in comparison to zinc dust. The presence of zinc flakes is thus needed within the broad range of about 5% to about 25% by volume.

The amorphous silica is needed, in order to provide soft sedimentation and to improve resistance against environmental attack. Amorphous silica makes the composition of the invention thixotropic, thus providing both ease of application and long term storage stability.

A wetting agent, if present improves coatability on untreated substrates and adhesion of dried coatings.

The amount of anhydrous alcohol solvent is restricted to a maximum of about 8% by volume, in order to maintain the total volatile organic content (VOC), including the solvent present in the alkyl silicate solution, below the amount permitted by federal regulations.

A substantially anhydrous ethyl silicate solution in ethanol containing about 40% by weight solids, which is suitable for use in the present invention, is sold by AKZO N.V. under the trademark "SILBOND". A one package moisture-cured grade designated as "SILBOND" H-12A in combination with "PURE SILBOND" (AKZO N.V., 30% solids)is preferred.

Zinc powder is available from Purity Zinc Co. and the Zinc Corporation of America (ZCA). Flake zinc having an average particle size of about 0.9 micron wide and 10 micron long is sold by Novamet Corp.

Ferrophosphate having an average particle size of about 10 microns, suitable for use in this invention, is available from Occidental Petroleum Corp.

Crystalline silica is produced by Malvern Minerals Inc. under the trademark "NOVACITE".

Amorphous silica may be produced by high temperature hydrolysis of silicon tetrachloride or by transformation of silica in an electric arc. Preferred pyrogenic amorphous silicas include those sold under the trademark "AEROSIL" by Degussa, and under the trademark "CABOSIL" by Cabot Corporation. "AEROSIL" 300 has an average particle size of about 0.007 micron. "AEROSIL" 972 is silane treated and has an average particle size of about 0.018 micron, while "AEROSIL" 974 has an average particle size of 0.008 micron.

A suitable nonionic wetting agent is sold by BYK Chemie under the trademark "ANTI-TERRA 204".

Preferably, the film forming substance is ethyl silicate in substantially anhydrous ethyl alcohol as a solvent, and the composition of the present invention also comprises about 15 to 20% ferrophosphate, about 2 to about 4% crystalline silica; and about 0.3 to about 1% of a wetting agent. Another preferred composition is a powder composition, wherein the film forming substance is an epoxy powder resin, and the composition also comprises: about 2 to about 3% of a hardener; and about 0.4 to about 1% of a flow control agent. Yet another preferred composition is a two-part water borne composition, the first part and second parts of said composition including an epoxy resin film forming substance and about 20 to 25% ferrophosphate, wherein the composition also comprises: a first part comprising: about 0.3 to about 1% of an anti-foaming agent; about 0.1 to about 0.6% of a wetting agent; and about 7 to 11% butyl cellusolve; and a second part comprising: about 2 to 4% butyl cellusolve; and about 2 to 4% water. A further preferred composition is a solvent borne off-white baking primer especially suited for coil and other heavy volume uses, wherein the film forming substance in an epoxy resin, and the composition also comprises about 0.2 to about 1% of an epoxy curing agent; about 15 to about 25% of rutile titanium dioxide powder; about 0.1 to about 0.6% of anti-foaming agents; about 0.05 to about 0.3% of a wetting agent; about 1 to 2% butanol; about 5 to 10% methyl isobutyl ketone; and about 5 to 10% of xylol. Another preferred compositioin is a solvent borne composition, wherein the film forming substance is an expoxy resin, and the composition also comprises: about 10 to about 205% of crystalline silica; about 6 to about 10% of a melamine hardening agent; about 0.05 to about 0.2% of a surfactant; about 0.05 to about 0.2% of an anti-forming agent; about 0.2 to 1% of an acid catalyst; and about 15 to 25% of a solvent mixture of methyl amyl ketone, butanol and Exxate 600.

The following non-limiting examples embody compositions of the invention.

EXAMPLE 1

An inorganic zinc-rich powder composition was prepared by mixing the components in a conventional paint mill, the quantities being in percent by weight based on the total weight:

| | |
|---|---|
| Ethyl silicate solution[1] (40% by weight solids) | 26.0% |
| Pure Ethylsilicate solution[2] (30% by weight solids) | 4.8 |
| Zinc powder 1213[3] | 39.1 |
| Zinc flakes (0.9 × 10 microns)[4] | 6.5 |
| Ferrophosphate (10 microns)[5] | 19.5 |
| Crystalline silica (9 microns)[6] | 3.2 |
| Amorphous silica (0.007 micron)[7] | 0.4 |
| Wetting agent[8] | 0.5 |
| | 100.0% |

[1] AKZO N.V. "Silbond" H-12A
[2] AKZO N.V. "Pure Silbond"
[3] ZCA (1213, 1222 and mixtures thereof)
[4] Novamet Corp.
[5] Occidental Petroleum grade #31
[6] Malvern Minerals "NOVACITE" 337
[7] Degussa "AEROSIL" 300 amorphous silica
[8] BYK Chemie "ANTI-TERRA 204" nonionic

EXAMPLE 2

An organic zinc rich powder primer was prepared in the same manner as in Example 1, with amounts again in percent by weight based on total weight:

| | |
|---|---|
| Epoxy powder resin[1] | 24.0% |
| Zinc powder[2] | 47.8 |
| Zinc flakes | 23.8 |
| (0.9 × 10 microns)[3] | |
| Amorphous silica (0.007 micron)[4] | 1.4 |
| Hardener[5] | 2.4 |
| Flow Control Agent[6] | 0.6 |
| | 100.0% |

[1]"EPON 2002" by Shell Chemical
[2]ZCA (1213, 1222 and mixtures thereof)
[3]Novamet Corp.
[4]Degussa "AEROSIL" 300 amorphous silica
[5]Huls "B-68"
[6]Estron "B-67"

EXAMPLE 3

An organic water borne two component composition was prepared by mixing 86.3 parts A with 13.7 parts B, the quantities being in percent by weight based on total weight:

| Part A | |
|---|---|
| Epoxy resin[1] | 6.9% |
| Zinc powder[2] | 44.0% |
| Ferrophosphate (9 microns)[3] | 23.6 |
| Amorphous silica (0.018 micron)[4] | 0.8 |
| Amorphous silica (0.007 micron)[5] | 0.5 |
| Anti-foaming agent[6] | 0.2 |
| Anti-foaming agent[7] | 0.3 |
| Wetting agent[8] | 0.3 |
| Butyl cellusolve[9] | 9.7 |
| | 86.3 |
| Part B | |
| Epoxy resin[1] | 6.9 |
| Butyl cellusolve[9] | 3.3 |
| Water | 3.5 |
| | 13.7 |

Part A + Part B = 100%.
[1]Epoxy VN 6227 - Reichhold
[2]ZCA (1213, 1222 and mixtures thereof)
[3]Occidental Petroleum grade #32
[4]Degussa "AEROSIL" 972
[5]Degussa "AEROSIL" 300
[6]"BYK 301" - BYK Chemie
[7]"BYK 052" - BYK Chemie
[8]"Anti-Terra 204" - BYK Chemie
[9]Eastman Chemicals Butyl Cellusolve

EXAMPLE 4

An off-white baking zinc-rich primer especially suited for coil and other heavy volume uses, was prepared by mixing the components, the quantities being in percent by weight based on total weight:

| | |
|---|---|
| Epoxy resin[1] | 11.5% |
| Epoxy curing agent[2] | 0.4 |
| Zinc powder[3] | 50.0 |
| Titanium dioxide, rutile[4] | 20.0 |
| Amorphous silica (0.018 microns)[5] | 0.5 |
| Amorphous silica (0.007 microns)[6] | 0.5 |
| Anti-foaming agent[7] | 0.15 |
| Anti-foaming agent[8] | 0.15 |
| Wetting agent[9] | 0.15 |
| Butanol[10] | 1.65 |
| Methylisobutylketone[11] | 7.5 |
| Xylol[12] | 7.5 |
| | 100.0% |

[1]Shell Chemical "Epon 1001 × 75"
[2]Dow Chemical "DEH 40"
[3]ZCA (1213, 1222 and mixtures thereof)
[4]Dupont "R-900"
[5]Degussa "AEROSIL" 972
[6]Degussa "AEROSIL" 300
[7]BYK Chemie "BYK 310"
[8]BYK Chemie "BYK 052"
[9]BYK Chemie "Anti-Terra 204"
[10,11]Eastman Chemicals
[12]Ashland Chemicals

EXAMPLE 5

A solvent-borne composition with zinc powder used instead of zinc dust on a volume for basis in Example 4 in U.S. Pat. No. 4,891,394.

| | |
|---|---|
| Epoxy resin[1] | 11.2% |
| Zinc powder[2] | 44.2 |
| Crystalline silica[3] | 14.7 |
| Amorphous silica (0.008 microns)[4] | 0.6 |
| Amorphous silica (0.007 microns)[5] | 1.2 |
| Ceclamine hardening agent[6] | 8.3 |
| Surfactant[7] | 0.1 |
| Anti-foaming agent[8] | 0.1 |
| Acid catalyst[9] | 0.5 |
| Solvents: | 19.2 |
| Mixture of methylisobutylketone[10], methylamylketone[11], butanol[12] and EXXATE 600[13] | |
| | 100.0% |

[1]Shell Chemicals, "1001F"
[2]ZCA (1213, 1222 and mixtures thereof)
[3]NOVALITE 1250 - Malvern Chemicals
[4]Degussa "AEROSIL" 974
[5]Degussa "AEROSIL" 300
[6]American Cyanamid CYMEL 303
[7]3M "FC 430"
[8]BYK Chemie "BYK 052"
[9]BYK Chemie "BYK 451"
[9]BYK Chemie "BYK
[10,11,12]Eastman Chemicals
[13]EXXON Tests have been conducted comparing coatings deposited from the compositions of the present invention with galvanizing coatings. All formulae disclosed gave a reading of 0.00 ohms/cm² at 75 microns equal to a deposition of 75 microns of galvanizing (pure zinc metal) compositions.

The composition of the invention and coatings deposited therefrom had the following properties: the composition was thixotropic and non-settling; application was easily effected by brushing, spraying and flowcoating; solvent resistance was excellent; and resistance against saltspray corrosion was about equal to the prior art coatings.

Thus it is apparent that there have been provided, in accordance with the invention, a zinc-powder rich coating composition which fully satisfies the object and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations which fall within the spirit and broad scope of the appended claims.

I claim:

1. A coating composition for use in protecting metallic substrates from corrosion, comprising in weight percent, based on the total weight of the composition:

from about 7% to 35% of a film-forming substance selected from the group consisting of: (i) alkyl silicate in substantially anhydrous alkyl alcohol as a solvent, (ii) powder and non-powder epoxy resins, (iii) vinyl chloride resins copolymerized with isocyanates, (iv) polyurethane resins, (v) polyester resins, (vi) polymers of acrylic, methacrylic esters and waterborne urethane, (vii) emulsion polymers prepared by the polymerization of monomers selected from the group consisting of acrylic, methacrylic, vinyl or styrenic monomers and mixtures thereof, and mixtures of the above seven classes of substances;

from about 35% to 55% of zinc powder;

from about 5% to 25% of zinc flakes;

from about 0.2% to 5% of at least one amorphous silica; and up to about 30% particulate ferrophosphate.

2. The composition of claim 1, wherein said film forming substance is ethyl silicate in substantially anhydrous ethyl alcohol as a solvent, said composition comprising about 15 to 20% ferrophosphate, said composition further comprising:

about 2 to about 4% crystalline silica; and about 0.3 to about 1% of a wetting agent.

3. The composition of claim 1, said composition being a powder composition, wherein said film forming substance is an epoxy powder resin, said composition further comprising:

about 2 to about 3% of a hardener; and about 0.4 to about 1% of a flow control agent.

4. The composition of claim 1, said composition being a two-part water borne composition, the first part and second parts of said composition including an epoxy resin film forming substance and about 20 to 25% ferrophosphate, said composition further comprising:

a first part comprising:
about 0.3 to about 1% of an anti-foaming agent;
about 0.1 to about 0.6% of a wetting agent; and
about 7 to 11% butyl cellusolve; and a second part comprising:
about 2 to 4% butyl cellusolve; and
about 2 to 4% water.

5. The composition of claim 1, said composition being a solvent borne off-white baking primer especially suited for coil and other heavy volume uses, wherein said film forming substance is an epoxy resin, said composition further comprising:

about 0.2 to about 1% of an epoxy curing agent;
about 15 to about 25% of rutile titanium dioxide powder;
about 0.1 to about 0.6% of anti-foaming agents;
about 0.05 to about 0.3% of a wetting agent;
about 1 to 2% butanol;
about 5 to 10% methyl isobutyl ketone;
about 5 to 10% of xylol.

6. The composition of claim 1, said composition being solvent borne, wherein said film forming substance is an epoxy resin, said composition further comprising:

about 10 to about 205% of crystalline silica;
about 6 to about 10% of a melamine hardening agent;
about 0.05 to about 0.2% of a surfactant;
about 0.05 to about 0.2% of an anti-foaming agent;
about 0.2 to 1% of an acid catalyst; and
about 15 to 25% of a solvent mixture of methyl amyl ketone, butanol and Exxate 600.

* * * * *